US006032346A

United States Patent [19]

[11] Patent Number: 6,032,346

[45] Date of Patent: Mar. 7, 2000

Holland

[54] BLEACHER SEAT CAP INSTALLATION TOOL

[76] Inventor: Robert L. Holland, 514 Joyner Ave., Exeter, Calif. 93221-2015

[21] Appl. No.: 09/025,542

[22] Filed: Feb. 18, 1998

[51] Int. Cl.[7] ........................................ B23P 11/00

[52] U.S. Cl. ........................................ 29/243.5; 29/243.58

[58] Field of Search ........................................ 29/243.5, 243.58

[56] References Cited

U.S. PATENT DOCUMENTS 1,664,529 4/1928 Schroeder ........................ 29/243.5
4,060,046 11/1977 Eckold et al. ........................ 29/243.5
4,660,265 4/1987 Pallymer ........................ 29/243.5
5,661,886 9/1997 Smith ........................ 29/243.5

FOREIGN PATENT DOCUMENTS 1446191 8/1973 Germany ........................ 29/243.58

*Primary Examiner*—David A. Scherbel
*Assistant Examiner*—Daniel G. Shanley
*Attorney, Agent, or Firm*—Fish & Neave; Nicola A. Pisano

[57] ABSTRACT

A bleacher seat cap installation tool is provided that has a first guide surface that slides along an edge of the seat board of the bleacher seat to be retrofit, and a second guide surface that guides a free end of a bleacher seat cap into position. The tool enables a single installer to install a bleacher seat cap quickly and easily, while avoiding injury or marring of the exterior surface of the bleacher seat cap.

20 Claims, 2 Drawing Sheets

BLEACHER SEAT CAP INSTALLATION TOOL

FIELD OF THE INVENTION

This invention relates to a tool for installing polymer-based bleacher seat caps. More particularly, the present invention provides a tool for easily installing polymer-based bleacher seat caps to rapidly retrofitting a stand of bleachers with reduced risk of injury to installation personnel.

BACKGROUND OF THE INVENTION

Bleacher seats typically are made of wood and consist of a single plank or seat board mounted either on permanent posts, as in many college stadiums, or on fold-up assemblies. Such seats, especially when permanently mounted outdoors, suffer considerable decomposition due to weathering. The wood from which the seat boards are formed also may become coarse and uncomfortable and unsafe to sit upon.

In recent years it has become feasible to retrofit and extend the life of wooden bleacher seats using single-piece protective caps. Bleacher seat caps generally comprise a C-shaped piece of plastic, such as polyvinylchloride, that has flanges along its lower edges. The cap is snapped atop the pre-existing seat board of the bleacher seat so that the flanges abut the lower surface of the seat board, and the cap covers the top, front and rear edges of the seat board. Such caps are described, for example, in U.S. Pat. Nos. 5,513,896 and 5,505,517, both to Groh et al., which are incorporated herein by reference.

While the bleacher seat caps described in the foregoing patents offer significant benefits, the single-piece version of such bleacher seat caps are often difficult to install. Typically, these caps are installed using 3-inch wide, stiff, putty knives. A front edge of the cap is first slid into place on a front edge of the seat board, and a putty knife is then used to pry the rear edge of the cap over the rear edge of the seat board.

A drawback of previously known bleacher seat cap installation techniques, however, is that the putty knives can mar the finish of the caps. Moreover, because previously known installation techniques permit only a small portion of the cap to be installed at a time, the installation process may be quite time consuming. The costs of installation labor using such methods can comprise a significant fraction of the overall cost of a retrofit project. In addition, it is not uncommon for installers to sustain hand and finger injuries during the installation process, for example, by having fingers caught between the edge of the seat cap and the seat board, or by being cut by the putty knife.

It would therefore be desirable to provide an installation tool, and methods of use, that enable installation of bleacher seat caps without marring the exterior surface of the caps.

It also would be desirable to provide an installation tool, and methods of use, that enable installation of bleacher seat caps without the use of sharp objects, thereby reducing injury hazards to installers.

It further would be desirable to provide an installation tool, and methods of use, that enable bleacher seat caps to be installed more rapidly and with greater ease than previously known methods.

It still further would be desirable to provide an installation tool, and methods of use, that permit the reduction of labor costs associated with installing bleacher seat caps during a retrofit project.

SUMMARY OF THE INVENTION

In view of the foregoing, it is an object of the invention to provide an installation tool, and methods of use, that enable installation of bleacher seat caps without marring the exterior surface of the caps.

It is another object of this invention to provide an installation tool, and methods of use, that enable installation of bleacher seat caps without the use of sharp objects, thereby reducing injury hazards to installers.

It is a further object of this invention to provide an installation tool, and methods of use, that enable bleacher seat caps to be installed more rapidly and with greater ease than previously known methods.

It is a still further object of the present invention to provide an installation tool, and methods of use, that permit the reduction of labor costs associated with installing bleacher seat caps during a retrofit project.

These and other objects of the invention are accomplished by providing a tool having a first guide surface that slides along an edge of the seat board of the bleacher seat to be retrofit, and a second guide surface that guides a free end of a bleacher seat cap into position. The tool, which may be machined or cast from a sturdy material, such as ultra high weight molecular plastic (UHMW) or aluminum, enables a single installer to install a bleacher seat cap quickly and easily, while avoiding marring of the exterior surface of the bleacher seat cap.

BRIEF DESCRIPTION OF THE DRAWINGS

Further features of the invention, its nature and various advantages will be apparent from the accompanying drawings and the following detailed description of the preferred embodiments, in which.

DETAILED DESCRIPTION OF THE INVENTION

Figure 1:
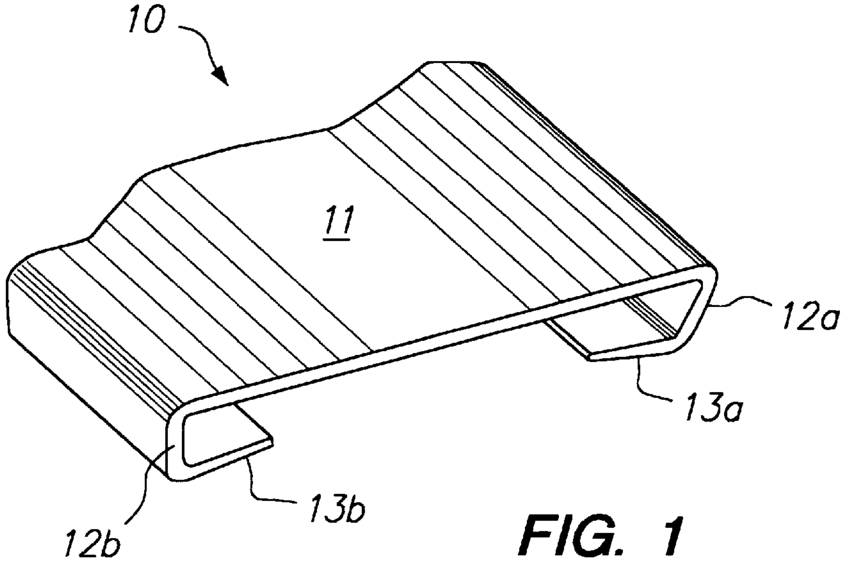
FIG. 1 PRIOR ART
FIG. 1 is a partial perspective view of a previously known single-piece bleacher seat cap used in retrofitting pre-existing wooden bleacher seats.

Referring to FIG. 1, a previously known single-piece bleacher seat cap 10 is described. Cap 10, is described, for example, in U.S. Pat. Nos. 5,513,896 and 5,505,517, both to Groh et al., which are incorporated herein by reference, and comprises top panel 11, side panels 12*a* and 12*b* and flanges 13*a* and 13*b*. When installed over a pre-existing wooden bleacher seat board, cap 10 not only prolongs the life of the bleacher seat, but also can improve comfort and safety of the seat occupants.

Previously known techniques for installing cap 10 generally involve hooking side panel 12*a* and flange 13*a* on a front edge of the seat board, and then prying side panel 12*b* and flange 13*b* over the opposing edge of the seat board using a putty knife, as described above. Because cap 10 is typically several feet in length, such previously known techniques are not only time consuming and labor intensive, but subject the installers to injury.

Referring now to FIGS. 2 and 3A to 3C, illustrative tool 20 constructed in accordance with the present invention is described. Tool 20 has front face 21 (see FIG. 3A) and rear face 22 (see FIG. 3B), and top 23, as oriented for use in installing a bleacher seat cap, such as shown in FIG. 1. Tool 20 comprises first guide surface 24 (shown in dotted line in FIG. 2) having channel 25 and flange 26, and second guide surface 27 having angled channel 28 (see FIG. 3C). Second guide surface 27 also includes angled surface 29. Base 30 may include indentations 31 (shown in dotted line) to enhance the installer's grip on tool 20. Alternatively, or in addition, base 30 may also include screw holes (not shown), for accepting a handle.

Channel 25 in first guide surface 24 enables tool 20 to slide along an edge of the seat board during the installation process. Angled channel 28 is engaged with a free end of the bleacher seat cap, and guides the flange of the free edge of the cap into position on the underside of the seat board. In particular, angled channel 28 causes the flange and side panel on the free end of the cap to flex outward and downward. As tool 20 is then advanced, angled surface 29 guides the flange and side panel to then engage the edge of the seat board.

Tool 20 preferably comprises a sturdy and lightweight material, and be cast, machined or injection molded from plastic, such as UHMW, or aluminum. In a preferred embodiment of the tool 20, the tool has length L of about 4 inches, height H of about 3 inches and width W of about 2 inches. Of course, the precise dimensions of tool 20, as well as the dimensions of channel 25 and angled channel 28 will depend upon the thickness of the seat board and the length of the side panel and flange of the bleacher seat cap.

Figure 2:
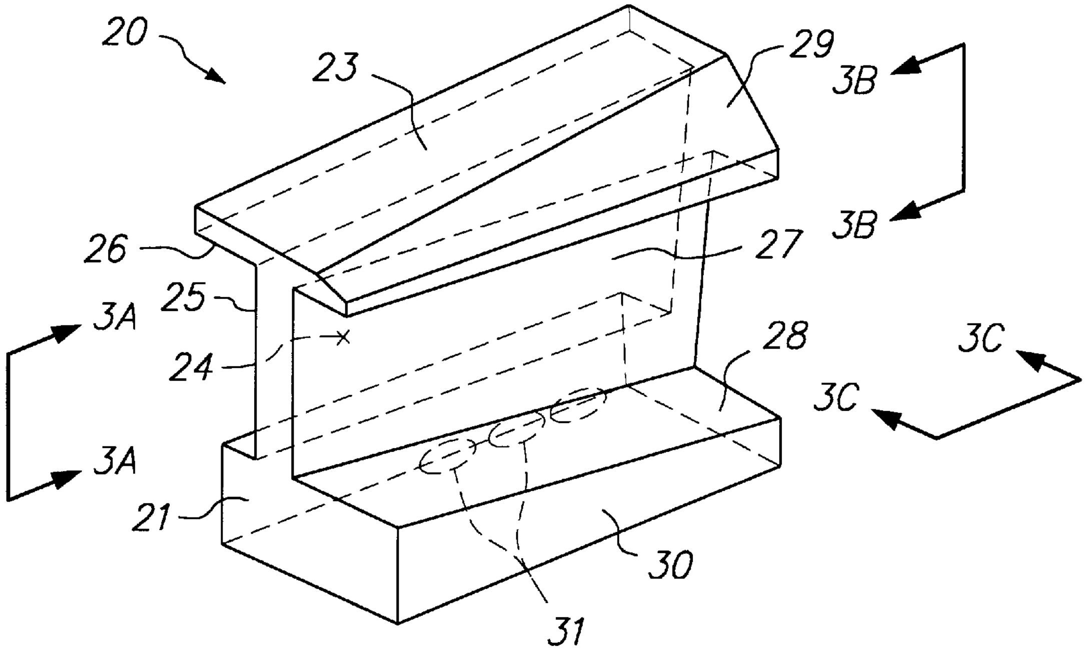
FIG. 2 is a perspective view of an illustrative installation tool constructed in accordance with the present invention for installing the bleacher seat cap of FIG. 1.
Figure 3A:
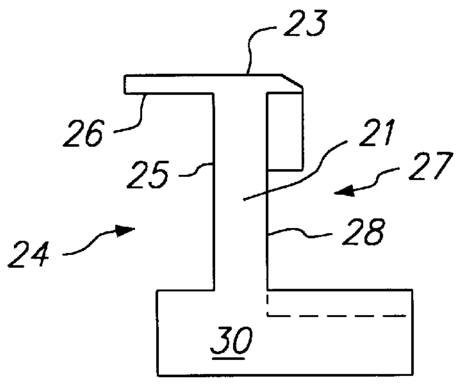
FIGS. 3A, 3B and 3C are views of the tool of FIG. 1 taken along view lines, 3A—3A, 3B—3B and 3C—3C, respectively, in FIG. 2.
Figure 3B:
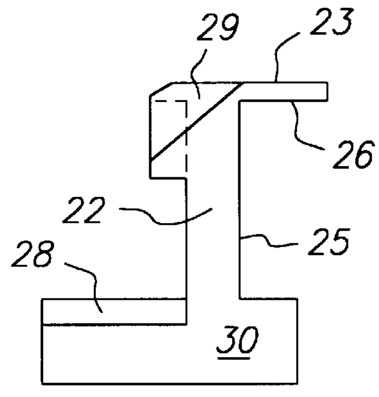
Figure 3C:
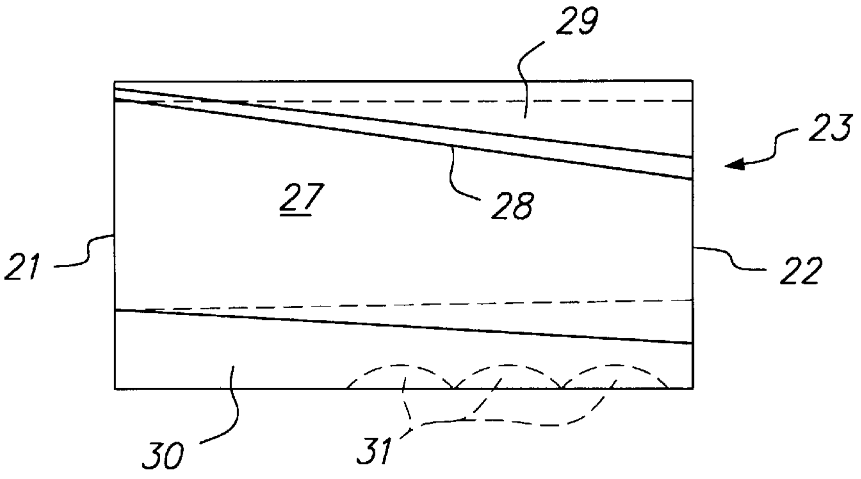
Figure 4:
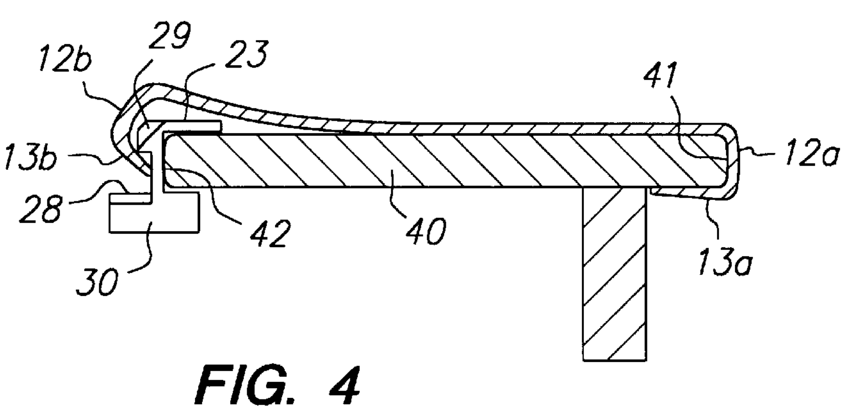
FIG. 4 shows use of the tool of FIG. 2 to install a bleacher seat cap on a pre-existing bleacher seat board.

Referring now to FIGS. 2 and 4, a method of employing tool 20 to install single-piece plastic bleacher seat cap 10 of FIG. 1 is described. Side panel 12*a* and flange 13*a* are first hooked over front edge 41 of seat board 40. Tool 20 is held by base 30 between the thumb and palm so that the fingers engage indentations 31, or gripped by an optional handle that may be attached to base 30. The tool is tilted so that a portion of top surface 23 of tool 20, nearest second guide surface 27, engages side panel 12*b* and flange 13*b* near one end of the cap. Tool 20 is oriented so that front face 21 is facing in the direction in which the tool will be advanced.

Tool 20 is then rotated towards edge 42 of set board 40, so that channel 25 of first guide surface 24 engages edge 42 and flange 26 contacts the upper surface of the seat board. This rotation of tool 20 also causes flange 13*b* and side panel 12*b* to flex and engage angled channel 28. When tool 20 is then advanced, angled channel 28 pulls flange 13*b* downward. As the tool is further advanced, the side panel 12*b* slides over angled surface 29 and allows flange 13*b* to engage the underside of seat board 40 along edge 42.

The tool is then continually advanced in the same direction from one end of cap 10 to the other, thus installing side panel 12*b* and flange 13*b* in a flowing motion, like sliding a zipper. When tool 20 is advanced to the other end of the cap, it is removed from between the cap and edge 42 of seat board 40, completing installation. Because the tool may be advanced in a continuous, flowing motion, there is less likelihood that the exterior finish of the cap will be marred, compared to previously known techniques that require a prying motion.

Tool 20 therefore enables a single-piece bleacher seat cap to be easily and quickly installed by a single installer, thus reducing the labor costs to install bleacher seat caps. Advantageously, tool 20 has no sharp edges likely to cause injury. In addition, because tool 20 is used with a linear sliding motion, rather than a prying motion, there is less likelihood that an installer's fingers could be caught between the seat board and cap.

It will be understood that the foregoing embodiment is merely illustrative, and that various modifications can be made by those skilled in the art without departing from the scope and spirit of the invention.

What is claimed is:

1. A tool (20) for installing a bleacher seat cap (11) over a seat board (40) having a lateral edge (42) and an underside, the bleacher seat cap (11) having a flange (13*b*) that engages the underside of the seat board (40), the tool (20) comprising:

a first guide surface (24) having a first channel (25), the first channel (25) engaging the lateral edge (42) of the seat board A(40), the first channel (25) configured for sliding movement along the lateral edge (42) of the seat board (40) in a first direction; and a second guide surface (27) having an angled channel (28), the angled channel (28) engaging the flange (13*b*) of the bleacher seat cap (11), the angled channel (28) pulling the flange (13*b*) into engagement with the underside of the seat board (40) when the tool (20) is advanced in the first direction.

2. The tool (20) as defined in claim 1 wherein the first guide surface (24) further comprises a flange (26) that contacts an upper surface of the seat board (40).

3. The tool (20) as defined in claim 1 wherein the tool (20) has a longitudinal axis, and the first channel (25) is disposed parallel to the longitudinal axis.

4. The tool (20) as defined in claim 1 wherein the tool (20) further comprises a base portion (30) having a plurality of indentations (31).

5. The tool (20) as defined in claim 1 wherein the tool (20) further comprises a front face (21) and a rear face (22), the angled channel (28) configured to slope downward from the front face (21) to the rear face (22).

6. The tool (20) as defined in claim 1 wherein the tool (20) further comprises an angled surface (29) that assists in engaging the flange (13*b*) of the bleacher seat cap (11) to the underside of the seat board (40).

7. The tool (20) as defined in claim 1 wherein the tool (20) comprises a sturdy, lightweight plastic material.

8. A tool for installing a bleacher seat cap (11) over a seat board (40) having a lateral edge (42) and an underside, the bleacher seat cap (11) having a flange (13*b*) that engages the underside of the seat board, the tool (20) comprising:

a front face (21);

a rear face (22);

a first lateral surface (24) disposed between the front (21) and rear (22) faces, the first lateral surface (24) having a first channel (25) configured to engage the lateral edge (42) of the seat board (40) for sliding movement in an installation direction; and a second lateral surface 27) disposed between the front (21) and rear (22) faces, the second lateral surface (27) having a second channel (28) that slopes downward between the front (21) and rear (22) faces, the second channel (28) engaging the flange (13*b*) of the bleacher seat cap (11) to pull the flange (13*b*) into engagement with the underside of the seat board (40) when the tool (20) is advanced in the installation direction.

9. The tool (20) as defined in claim 8 wherein the first lateral surface (24) further comprises a flange (26) that contacts an upper surface of the seat board (40).

10. The tool (20) as defined in claim 8 wherein the tool (20) has a longitudinal axis, and the first channel (25) is disposed parallel to the longitudinal axis.

11. The tool (20) as defined in claim 8 wherein the tool (20) further comprises a base portion (30) having a plurality of indentations (31).

12. The tool (20) as defined in claim 8 wherein the tool (20) further comprises an angled surface (29) that assists in engaging the flange (13*b*) of the seat board (11) to the underside of the seat board (40).

13. The tool (20) as defined in claim 8 wherein the tool (20) comprises a sturdy, lightweight plastic material.

14. A tool (20) for installing a bleacher seat cap (11) over a seat board (40) having a lateral edge (42) and an underside, the bleacher seat cap (11) having a flange (13*b*) that engages the underside of the seat board (40), the tool (20) comprising:

a first guide surface (24) having a first channel (25) configured to engage the lateral edge (42) of the seat board (40) for sliding movement in a first direction; and a second guide surface (27) having an second channel (28) configured to engage the flange (13*b*) of the bleacher seat cap (11) and pull the flange (13*b*) into engagement with the underside of the seat board (40) when the tool (20) is advanced in the first direction.

15. The tool (20) as defined in claim 14 wherein the first guide surface (24) further comprises a flange (26) that contacts an upper surface of the seat board (40).

16. The tool (20) as defined in claim 14 wherein the tool (20) has a longitudinal axis, and the first channel (25) is disposed parallel to the longitudinal axis.

17. The tool (20) as defined in claim 14 wherein the tool (20) further comprises a base portion (30) having a plurality of indentations (31).

18. The tool (20) as defined in claim 14 wherein the tool (20) further comprises a front face (21) and a rear face (22), the second channel (28) configured to slope downward from the front face (21) to the rear face (22).

19. The tool (20) as defined in claim 14 wherein the tool (20) further comprises an angled surface (29) that assists in engaging the flange (13*b*) of the bleacher seat cap (11) to the underside of the seat board (40).

20. The tool (20) as defined in claim 14 wherein the tool (20) comprises a sturdy, lightweight plastic material.

* * * * *